US012470525B1

(12) United States Patent
Ezrielev et al.

(10) Patent No.: US 12,470,525 B1
(45) Date of Patent: Nov. 11, 2025

(54) MANAGING CONTINUATION OF ANONYMOUS GUEST SESSIONS

(71) Applicant: Dell Products L.P., Round Rock, TX (US)

(72) Inventors: Ofir Ezrielev, Beer Sheva (IL); Pankaj Pande, Carlingford (AU)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 18/756,128

(22) Filed: Jun. 27, 2024

(51) Int. Cl.
*H04L 9/08* (2006.01)
*H04L 9/40* (2022.01)

(52) U.S. Cl.
CPC .......... *H04L 63/0421* (2013.01); *H04L 63/08* (2013.01)

(58) Field of Classification Search
CPC ............................ H04L 63/0421; H04L 63/08
See application file for complete search history.

(56) References Cited

U.S. PATENT DOCUMENTS

| | | | |
|---|---|---|---|
| 11,722,461 B2 * | 8/2023 | Frost ................... | H04L 63/08 |
| 11,860,914 B1 | 1/2024 | Qadrud-Din et al. | |
| 2008/0262920 A1 * | 10/2008 | O'Neill ................. | G06Q 30/02 |
| | | | 705/26.1 |
| 2010/0071027 A1 * | 3/2010 | Agulnik ................ | H04W 4/08 |
| | | | 726/1 |
| 2023/0377748 A1 | 11/2023 | Yang et al. | |
| 2024/0015158 A1 * | 1/2024 | Lopez ................... | H04L 63/108 |
| 2024/0396747 A1 * | 11/2024 | Urban ................... | H04L 9/0877 |

FOREIGN PATENT DOCUMENTS

WO    2023224819 A1    11/2023

OTHER PUBLICATIONS

Silva, Manny, "Retrieval augmented generation: Keeping LLMs relevant and current," Oct. 18, 2023, Web Page <https://stackoverflow.blog/2023/10/18/retrieval-augmented-generation-keeping-llms-relevant-and-current> accessed on Jun. 27, 2024 (17 Pages).
Gao, Yunfan, et al. "Retrieval-augmented generation for large language models: A survey." arXiv preprint arXiv:2312.10997 (2023)(21 Pages).

(Continued)

*Primary Examiner* — Normin Abedin
(74) *Attorney, Agent, or Firm* — WOMBLE BOND DICKINSON (US) LLP

(57) ABSTRACT

Methods and systems for managing sessions between guests and computer implemented services are disclosed. Upon initiating a session, it may be determined whether a guest wishes to remain anonymous during the session. If the guest wishes to remain anonymous and wishes for the anonymous session to be able to be continued, a session tracking token may be issued to the guest. Context information may be collected based on the guest's interactions with the computer implemented services and the context information may be associated with the session tracking token. If the guest wishes to continue the anonymous session at a future point in time, the guest may provide the context information and the session tracking token. If the context information and session tracking token are successfully validated, the previous anonymous session may be restored without linking the context information to an identity of the user.

20 Claims, 6 Drawing Sheets

(56) References Cited

OTHER PUBLICATIONS

Radlinski, Filip, et al., "Query chains: learning to rank from implicit feedback." Proceedings of the eleventh ACM SIGKDD international conference on Knowledge discovery in data mining. 2005 (10 Pages).

Qian, Cheng, et al. "Tell me more! towards implicit user intention understanding of language model driven agents." arXiv preprint arXiv:2402.09205 (2024)(26 Pages).

Beswick, James, "Managing sessions of anonymous users in WebSocket API-based applications," Amazon Web Services, Mar. 10, 2023, Web Page <https://aws.amazon.com/blogs/compute/managing-sessions-of-anonymous-users-in-websocket-api-based-applications/> accessed on Jun. 27, 2024 (9 Pages).

* cited by examiner

MANAGING CONTINUATION OF ANONYMOUS GUEST SESSIONS

FIELD

Embodiments disclosed herein relate generally to sessions between guests and computer implemented services. More particularly, embodiments disclosed herein relate to systems and methods to manage continuation of anonymous sessions between guests and computer implemented services.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components, and hosted entities such applications, may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
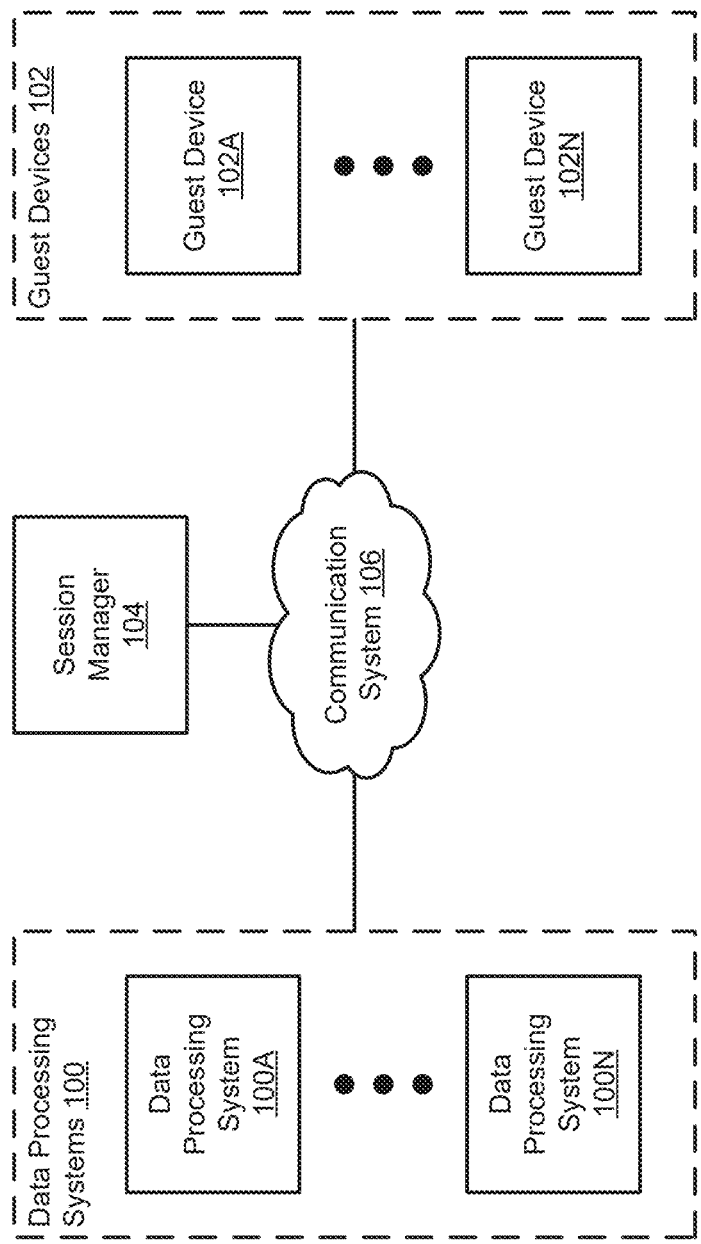
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing sessions between users (e.g., guests) and computer implemented services. A session between a guest and the computer implemented services may occur over a duration of time and may include any interactions between the guest's device (e.g., a data processing system) and any number of other devices that facilitate and/or participate in provision of the computer implemented services.

A quality of the computer implemented services for a guest (e.g., customizability and/or accessibility of the computer implemented services for the guest) may be impacted by a quantity of context information available about the guest. Context information may include records of actions performed by the guest while utilizing the computer implemented services. For example, a data processing system may manage a website that includes online shopping functionality. The data processing system may wish to track context information regarding items a guest placed in a digital shopping cart during a previous session in order to tailor product recommendations to the user upon initiation of a new session with the website.

However, entities offering computer implemented services may be subject to various data privacy regulations (e.g., general data protection regulation (GDPR)). Such data privacy regulations and/or other policies may limit the collection of context information usable to infer an identity of a guest. Consequently, the data processing system(s) providing the computer implemented services may not be able to collect identifiable context information about guests without explicit consent from the guests.

Some guests may be unwilling to provide permission for identifiable tracking during a session and, therefore, the computer implemented services available to the guest during the session may be less desirable. Continuing with the above example, if the guest wishes to remain anonymous during a session while utilizing the online shopping functionality, items placed in the digital shopping cart during previous sessions may be deleted and/or recommendations for products may not be based on the guest's previous online shopping history.

To improve the quality of the computer implemented services provided to a guest during an anonymous session, the guest may be issued a session tracking token. A session tracking token may be used to link a first anonymous session to future anonymous sessions. To do so, a guest who wishes to remain anonymous may be prompted to indicate whether they wish for the anonymous session to be able to be continued (after conclusion of the anonymous session). If the guest indicates that they wish for the anonymous session to be able to be continued, a session tracking token may be issued to the guest.

During the anonymous session, context information about the anonymous session may be stored by a management entity. The context information may be associated with the session tracking token but may not include identifying information about the guest. Upon conclusion of the session, the management entity may store a transformed version of the context information (e.g., a hash of the context information), may associate the transformed context information with the session tracking token, and may delete the un-transformed context information. The un-transformed context information and the session tracking token may be retained by the guest (e.g., a device operated by the guest) and may be usable to resume the session at a future point in time.

To resume the session at the future point in time, the guest may initiate a second anonymous session and may indicate that they wish to continue a previous anonymous session. The guest may then be prompted to provide the session tracking token and the context information. Upon receipt of an alleged copy of the session tracking token from the guest's device, the management entity may transform (e.g., via a hash function) the context information to obtain transformed context information, may identify transformed context information from storage associated with the provided alleged session tracking token, and may compare the transformed context information provided by the guest to the transformed context information from storage. If the transformed context information provided by the guest matches the stored transformed context information associated with the provided alleged copy of the session tracking token, the previous anonymous session may be restored.

Restoring the previous anonymous session may allow the guest to utilize the computer implemented services in the context of the previous anonymous session to facilitate continuation of the session anonymously. By doing so, a quality of computer implemented services provided during anonymous sessions for guests may be enhanced while protecting identifying information for the guests and complying with data privacy regulations.

In an embodiment, a method for managing sessions between guests and computer implemented services is provided. The method may include: identifying a new guest that desires to utilize the computer implemented services; based on the identifying of the new guest: performing an anonymity intent resolution process for the new guest to identify whether the new guest wishes to remain anonymous; in an instance of the performing of the anonymity intent resolution process where the new guest wishes to remain anonymous: performing a session intent resolution process for the new guest; in an instance of the session intent resolution process where the new guest wishes for a session to be able to be continued: issuing, to the new guest, a session tracking token; storing, based on an initial portion of the session, context information based on an interaction between the new guest and the computer implemented services during the initial portion of the session; and associating the context information with the session tracking token.

The method may also include: after the initial portion of the session ends: identifying a second new guest that desires to utilize the computer implemented services; based on the identifying of the second new guest: performing a second anonymity intent resolution process for the second new guest to identify whether the second new guest wishes to remain anonymous; in an instance of the performing of the second anonymity resolution process where the new guest wishes to remain anonymous: performing a second session intent resolution process for the second new guest; in an instance of the second session intent resolution process for the second new guest where the second new guest wishes for a previous anonymous session to be continued: obtaining, from the second new guest, an alleged copy of the session tracking token; restoring, using the alleged copy of the session tracking token and the context information associated with the session tracking token, the session; and enabling the second new guest to utilize the computer implemented services in context of the initial portion of the session to facilitate continuation of the session anonymously.

The context information may be stored with a device utilized by the new guest and may not be retained by a system that provides the computer implemented services and/or that interacted with the new guest.

The method may also include storing a hash of the context information with the system.

Restoring the session may include: obtaining the context information from a device utilized by the second new guest; attempting to validate the context information using the hash; and in an instance of the attempting where the context information is validated: concluding that the context information is usable to restore the session.

The method may also include: identifying that the second new guest wishes to link the session to an existing known guest that does not wish to remain anonymous; obtaining, from the second new guest, credentials for the existing known guest; and in an instance of the obtaining where the credentials are usable to authenticate the second new guest: adding the context information to other context maintained for the known guest to facilitate merging of the session with another session for the known guest.

The computer implemented services may be provided by a first system, the new guest may utilize a second system to utilize the computer implemented services provided by the first system, and the first system may be configured to only retain context information regarding use of the computer implemented services by guests that do not express an intent to remain anonymous during active sessions for the guests.

The session tracking token may not be associated with any guest that utilizes the computer implemented services.

The session tracking token may be usable to identify whether context information provided by one of the guests was generated during a corresponding session with the one of the guests.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide, at least in part, computer implemented services. The computer implemented services may include any type and quantity of services including, for example, data services (e.g., data storage, access and/or control services), communication services (e.g., instant messaging services, video-conferencing services), and/or any other type of service that may be implemented with a computing device.

The computer implemented services may be provided, at least in part, during sessions between guests (e.g., users of guest devices 102) and computer implemented services (e.g., managed and/or facilitated by data processing systems 100). Other types of computer implemented services may be provided by the system shown in FIG. 1 without departing from embodiments disclosed herein. The computer implemented services may be provided by, for example, data processing systems 100, session manager 104, guest devices 102, and/or any other type of devices (not shown in FIG. 1).

A quality of the computer implemented services provided during a session may be impacted by an amount of context information collected during a session. Context information may include information related to behavior of a guest during a session (e.g., configurations selected, documents and/or websites viewed, online shopping behaviors). However, entities providing computer implemented services may be subject to data privacy regulations and/or other policies that may limit collection of context information linked to identities of guests (e.g., users). The data privacy regulations may be based on a geographical location (e.g., GDPR) and/or may be imposed for other reasons. Data privacy regulations may indicate that identifying context information may not be collected without explicit permission from a guest.

Therefore, initiation of a session between a guest device (e.g., 102A) and the computer implemented services may include querying guest device 102A to determine whether a user of guest device 102A wishes to remain anonymous while utilizing the computer implemented services. If the guest does not wish to remain anonymous, the guest may provide credentials (e.g., a username, a password) and/or may create a new profile by providing identifying information (e.g., a name, an email address, a phone number). By doing so, context information associated with the guest may be collected during sessions and used to enhance future sessions for the guest. For example, online shopping behavior of a guest during a session may impact product recommendations made to the guest during future sessions.

However, if the guest wishes to remain anonymous, context information may not be collected and/or retained for the guest which may negatively impact the guest's experience utilizing the computer implemented services. Continuing with the above example, if a guest wishes to remain anonymous, online shopping behavior of the guest during the anonymous session may not be tracked and, therefore, future anonymous sessions for the guest may not be tailored to preferences and/or past behaviors of the guest.

In general, embodiments disclosed herein may provide methods, systems, and/or devices for managing sessions between guests and computer implemented services in a manner that increases a likelihood of providing desired computer implemented services. To do so, guests initiating sessions may be queried to determine if they wish to remain anonymous. If a guest indicates that they would like to remain anonymous during the session, the guest may be queried to determine whether the guest wishes for the anonymous session to be able to be continued. If the guest indicates that they would like to be able to continue the anonymous session at a future point in time, a session tracking token may be issued to the guest.

During the session, context information may be collected and may be associated with the session tracking token (e.g., rather than associating the context information with an identity of the guest). Upon completion of the session, a management entity (e.g., session manager 104) may store a transformed version of the context information (e.g., a hash of the context information) and provide the un-transformed context information to the guest to store on the guest's device (e.g., guest device 102A) along with the associated session tracking token. The management entity may delete the un-transformed version of the context information from storage.

At a point in time after completion of the session, the guest (e.g., the user) may initiate a second session. The guest may be queried to determine whether the guest wishes to remain anonymous during the second session. If the guest indicates that they wish to remain anonymous, the guest may be queried to determine if the guest wishes for the anonymous session to be able to be continued and/or if the guest wishes to continue a previous anonymous session. The guest may then provide the un-transformed context information and an alleged copy of the session tracking token to indicate that they wish to continue a previous anonymous session.

To restore the previous anonymous session, a management entity (e.g., session manager 104) may obtain a transformed version of (e.g., a hash of) the provided un-transformed context information. The transformed version of the provided context information may be compared to stored transformed context information associated with the alleged copy of the session tracking token. If the transformed provided context information matches the stored transformed context information, the previous anonymous session may be restored for the guest. By doing so, the guest may be able to utilize the computer implemented services in the context of the previous session, which may increase a quality of the computer implemented services available to the guest.

At any time (e.g., during an anonymous session, after conclusion of an anonymous session) a guest may request deletion of context information associated with the anonymous session and/or may choose to link the context information to an existing user profile (e.g., including identifying information for the guest).

By doing so, the guest's experience may be enhanced while utilizing the computer implemented services anonymously. Consequently, the computer implemented services may be more likely to be provided to guests as desired.

To provide the above noted functionality, the system of FIG. 1 may include data processing systems 100, guest devices 102, session manager 104, and communication system 106. Each of these components is discussed below.

Session manager 104 may perform tasks relating to management of and/or facilitation of sessions between guests and the computer implemented services. For example, session manager 104 may: (i) identify a new guest that desires to utilize the computer implemented services, (ii) perform an anonymity intent resolution process for the new guest to identify whether the new guest wishes to remain anonymous, (iii) if the new guest wishes to remain anonymous, performing a session intent resolution process for the new guest to determine if the new guest wishes for the anonymous session to be able to be continued, (iv) if the guest wishes for the anonymous session to be able to be continued, issuing a session tracking token to the new guest, (v) storing context information based on an interaction between the new guest and the computer implemented services, (vi) associating the context information with the session tracking token, and/or (vii) perform other actions.

When the anonymous session is concluded, session manager 104 may initiate: (i) storage of a hash of the context information (e.g., locally and/or remotely at one or more of data processing systems 100), (ii) providing of the un-transformed context information to the guest (e.g., for storage on guest device 102A), (iii) deletion of the un-transformed context information (e.g., from local and/or remote storage) and/or (iv) perform other actions.

After the anonymous session ends, session manager 104 may: (i) identify a second new guest (e.g., the new guest, a guest that is not the new guest) that desires to utilize the computer implemented services, (ii) perform a second anonymity intent resolution process for the second new guest to identify whether the second new guest wishes to remain anonymous, (iii) if the second new guest wishes to remain anonymous, performing a second session intent resolution process for the second new guest to determine whether the second new guest wishes for a new anonymous session to be able to be continued and/or if the second new guest wishes for a previous anonymous session to be continued, (iv) if the second new guest wishes for a previous anonymous session to be continued, obtaining an alleged copy of the session tracking token (and context information) from the second new guest, (v) restoring, using the alleged copy of the session tracking token and the context information associated with the session tracking token, the session, (vi) enabling the second new guest to utilize the computer implemented services in the context of the previous anonymous session to facilitate continuation of the session anonymously, and/or (vii) other methods.

Restoring the session may include: (i) obtaining the context information from the second new guest (e.g., via one of guest devices 102), (ii) attempting to validate the context information using the hash of the context information obtained upon conclusion of the previous anonymous session and associated with the session tracking token (e.g., by computing a hash of the provided context information and comparing to the stored hash), (iii) if the context information is validated, concluding that the context information is usable to restore the session, and/or (iv) other actions.

Session manager 104 may also: (i) receive requests from users of guest devices 102 to delete copies of hashed context information, (ii) receive requests from users of guest devices 102 to associated session tracking tokens with existing known guests (e.g., identified guests that are not anonymous), and/or (iii) perform other actions.

Data processing systems 100 may include any type and/or number of data processing systems (e.g., 100A, 100N). Each data processing system of data processing systems 100 may include hardware and/or software components configured to obtain data, store data, provide data to other entities, and/or to perform other tasks to facilitate provision of the computer implemented services.

For example, users of guest devices 102 may utilize the computer implemented services via interactions with any of data processing systems 100. To do so, data processing systems 100 may exchange information with any of guest devices 102, may monitor behavior of users of guest devices 102 during sessions, etc. In addition, data processing systems 100 may store context information, hashes of context information, session tracking tokens, hashes of user credentials, and/or other information usable to restore previous sessions for anonymous and/or non-anonymous (e.g., identified) guests.

Guest devices 102 may include any type and/or quantity of devices (e.g., data processing systems) used by guests to utilize computer implemented services via initiating sessions. A guest may initiate a session by, for example, visiting a website and/or opening an application on a device. Guest devices 102 may include personal laptop computers, desktop computers, tablets, personal smart phones, and/or any other device usable by an individual to utilize the computer implemented services during a session.

Prior to initiating a session and/or restoring a previous session, guest devices 102 may receive any number of queries (e.g., from session manager 104) regarding anonymity intent processes and/or session intent processes. Guest devices 102 may obtain user input (e.g., via user interaction with a graphical user interface (GUI)) and may provide responses to the queries to session manager 104. Guest devices 102 may be used by guests to utilize the computer implemented services (e.g., access websites, access data stored by data processing systems 100, initiate and/or complete online transactions).

Guest devices 102 may receive and/or store copies of session tracking tokens, context information regarding anonymous sessions, and/or other data usable to restore previous anonymous sessions.

When providing their functionality, any of (and/or components thereof) data processing systems 100, guest devices 102, and/or session manager 104 may perform all, or a portion, of the actions and methods illustrated in FIGS. 2A-3B.

Any of (and/or components thereof) data processing systems 100, guest devices 102, and session manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
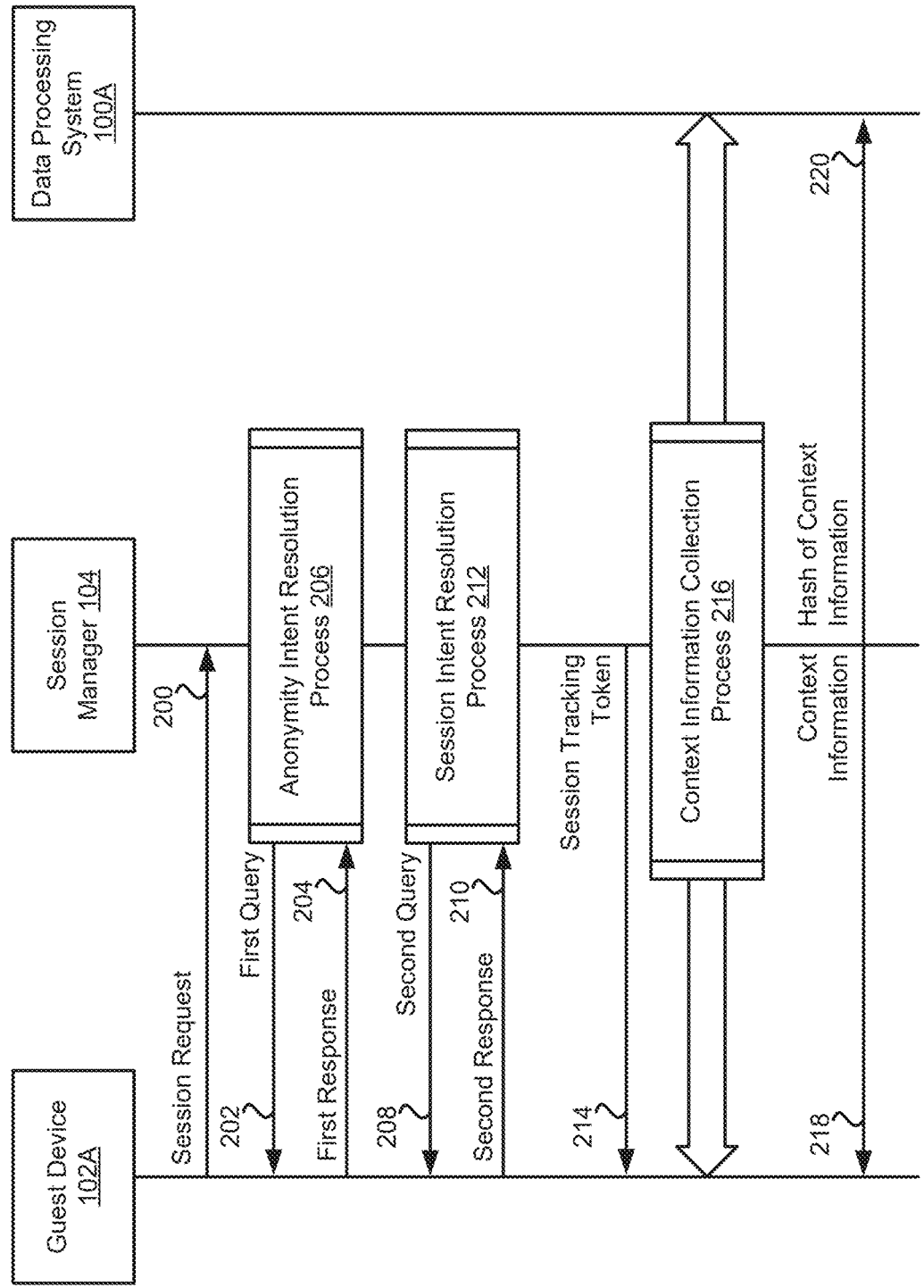
FIGS. 2A-2B show data flow diagrams in accordance with an embodiment.
Figure 2B:
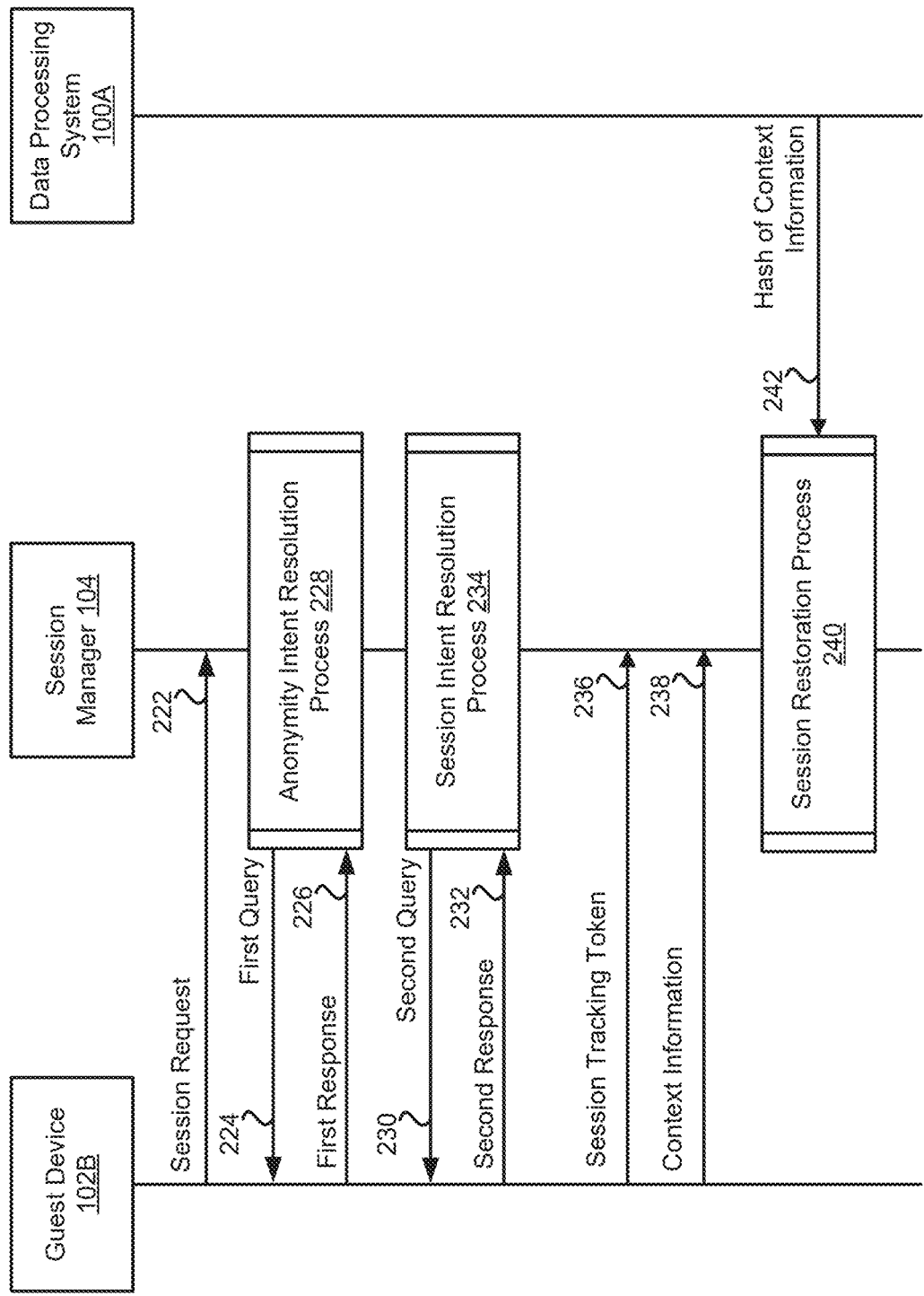

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 102A, 104, etc.), located towards the top of each figure. Lines descend from these shapes. Processes performed by the components of the system are illustrated using a second set of shapes (e.g., 206, 212, etc.) superimposed over these lines. Interactions (e.g., communication, data transmissions, etc.) between the components of the system are illustrated using a third set of shapes (e.g., 200, 202, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 202. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during management of a session between a new guest and the computer implemented services. The computer implemented services may be provided by data processing system 100A and the new guest may utilize guest device 102A to utilize the computer implemented services provided by data processing system 100A. Data processing system 100A may be configured to only retain context information regarding use of the computer implemented services by guests that do not express an intent to remain anonymous during active sessions for the guests.

To manage the session between the new guest and the computer implemented services, the new guest (e.g., a user of guest device 102A) may request initiation of a session by providing a session request to session manager 104. The session request may include, for example, an indication that the user of guest device 102A wishes to utilize the computer implemented services. The session request may be initiated by the new guest via: (i) making a selection on a GUI of guest device 102A (ii) navigating to a website managed by session manager 104, (iii) opening an application on a device managed by session manager 104, and/or (iv) other methods.

At interaction 200, the session request may be provided to session manager 104 by guest device 102A. For example, the session request may be generated and provided to session manager 104 via (i) transmission via a message, (ii) storing in a storage with subsequent retrieval by session manager 104, (iii) via a publish-subscribe system where session manager 104 subscribes to updates from guest device 102A thereby causing a copy of the session request to be propagated to session manager 104, and/or via other processes. By providing the session request to session manager 104, guest device 102A may provide information usable to facilitate initiation of a session between guest device 102A and computer implemented services (e.g., provided and/or facilitated by session manager 104 and/or data processing system 100A).

To initiate, at least in part, the requested session, anonymity intent resolution process 206 may be performed. During anonymity intent resolution process 206, information may be exchanged with guest device 102A to determine whether the new guest wishes to remain anonymous during the requested session. During anonymity intent resolution process, interactions 202 and 204 may occur.

At interaction 202, a first query may be provided to guest device 102A by session manager 104. For example, the first query may be generated and provided to guest device 102A via (i) transmission via a message, (ii) storing in a storage with subsequent retrieval by guest device 102A, (iii) via a publish-subscribe system where guest device 102A subscribes to updates from session manager 104 thereby causing a copy of the first query to be propagated to guest device 102A, and/or via other processes. The first query may include a prompt displayed to the user of guest device 102A via a GUI, via a transmitted message, etc.

The first query may prompt the user (e.g., the new guest) to indicate whether they wish to remain anonymous during the requested session. The first query may be provided to guest device 102A to facilitate initiation of a session between guest device 102A and computer implemented services (e.g., provided and/or facilitated by session manager 104 and/or data processing system 100A).

At interaction 204, a first response may be provided to session manager 104 by guest device 102A. For example, the first response may be generated and provided to session manager 104 via (i) transmission via a message, (ii) storing in a storage with subsequent retrieval by session manager 104, (iii) via a publish-subscribe system where session manager 104 subscribes to updates from guest device 102A thereby causing a copy of the first response to be propagated to session manager 104, and/or via other processes. The first response may include an indication of whether the new guest wishes to remain anonymous and the new guest may generate the first response via interaction with a GUI, via a transmitted message, etc.

By providing the first response to session manager 104 and, therefore, indicating that the new guest wishes to remain anonymous, session manager 104 may be prompted to perform session intent resolution process 212.

To determine a manner in which to initiate an anonymous session for the new guest, session manager 104 may perform session intent resolution process 212. During session intent resolution process 212, information may be exchanged with guest device 102A to determine whether the user of guest device 102A wishes for the anonymous session to be able to be continued. During anonymity intent resolution process, interactions 208 and 210 may occur.

At interaction 208, a second query may be provided to guest device 102A by session manager 104. For example, the second query may be generated and provided to guest device 102A via (i) transmission via a message, (ii) storing in a storage with subsequent retrieval by guest device 102A, (iii) via a publish-subscribe system where guest device 102A subscribes to updates from session manager 104 thereby causing a copy of the second query to be propagated to guest device 102A, and/or via other processes. The second query may include a prompt displayed to the user of guest device 102A via a GUI, via a transmitted message, etc.

The second query may prompt the new guest to indicate whether they wish for the anonymous session to be able to be continued. The second query may be provided to guest device 102A to facilitate initiation of a session between guest device 102A and computer implemented services that may be restored at future points in time after conclusion of the session.

At interaction 210, a second response may be provided to session manager 104 by guest device 102A. For example, the second response may be generated and provided to session manager 104 via (i) transmission via a message, (ii) storing in a storage with subsequent retrieval by session manager 104, (iii) via a publish-subscribe system where session manager 104 subscribes to updates from guest device 102A thereby causing a copy of the second response to be propagated to session manager 104, and/or via other processes. The second response may include an indication of whether the new guest wishes for the anonymous session to be able to be continued at future points in time and the new guest may generate the second response via interaction with a GUI, via a transmitted message, etc.

By providing the second response to session manager 104 and, therefore, indicating that the new guest wishes for the anonymous session to be able to be continued, session manager 104 may be prompted to issue a session tracking token to guest device 102A.

The session tracking token may include any sequence of numbers, letters, and/or other characters and may be usable, at least in part, to continue previous anonymous sessions. To do so, the session tracking token may be stored by guest device 102A (e.g., via a browser, via other local storage). Session manager 104 may also store a copy of the session tracking token (e.g., locally and/or remotely). The session tracking token may not be associated with any guest that utilizes the computer implemented services (e.g., an identified guest via creation of a profile).

At interaction 214, the session tracking token may be provided to guest device 102A by session manager 104. For example, the session tracking token may be generated and provided to guest device 102A via (i) transmission via a message, (ii) storing in a storage with subsequent retrieval by guest device 102A, (iii) via a publish-subscribe system where guest device 102A subscribes to updates from session manager 104 thereby causing a copy of the session tracking token to be propagated to guest device 102A, and/or via other processes.

By doing so, any context information (e.g., recorded behavior of the new guest) collected during an anonymous session may be associated with the session tracking token rather than with an identity of an individual. Therefore, the session tracking token may be usable at a future point in time to restore the anonymous session in the context of the previous anonymous session.

Following interaction 214, the anonymous session requested by the new guest may begin and the new guest (e.g., the user of guest device 102A) may begin to utilize the computer implemented services. Utilizing the computer implemented services may include actions such as uploading content (e.g., text, pictures, video) to a website, downloading content from the website, purchasing products from an online shop, etc.

When the anonymous session begins between the new guest and the computer implemented services (e.g., which may be provided by data processing system 100A), session manager 104 may perform context information collection process 216. During context information collection process 216, any amount of context information may be collected. Context information may include any information regarding actions performed by the new guest during the session, interactions between guest device 102A and data processing system 100A, and/or other information. A double-sided arrow is shown between guest device 102A and data processing system 100A in FIG. 2A to indicate that context information collection process 216 may be performed while information is being exchanged between guest device 102A and data processing system 100A.

Context information may include, for example, a list of items a guest (e.g., user) placed in a digital shopping cart during an anonymous session, a duration of time during which the user browsed the online shopping website prior to placing the products in the digital shopping cart, whether any of the items were removed from the digital shopping cart, and which items were ultimately purchased by the user during the anonymous session.

During context information collection process 216, the context information may be temporarily stored by session manager 104 and/or data processing system 100A and may be associated with the session tracking token. Context information collection process 216 may continue until the anonymous session is concluded.

Upon conclusion of the session, session manager 104 may provide a copy of the context information to guest device 102A and a hash of the context information to data processing system 100A. The context information provided to guest device 102A (at interaction 218) and used to generate the hash of the context information may include a portion of the total context information collected during context information collection process 216. For example, some portions of the context information may be excluded based on relevance, levels of detail, etc. Session manager 104 may generate the hash of the context information via performing a data transformation process (not shown) using the context information and a hash function. The un-transformed context information may be deleted from storage and may not be retained by session manager 104, data processing system 100A, and/or any other entity participating in the provision of the computer implemented services.

In addition, the context information provided to guest device 102A may include a textual summary of the context information obtained during context information collection process 216. The textual summary may be generated by a large language model (LLM) and, by doing so, the un-summarized context information may not be provided to a potentially unsafe location (e.g., guest device 102A). To further increase security for the context information, a random string of text may be added to the start and/or the end of the textual summary prior to generating the hash of the textual summary. By doing so, the hash of the textual summary may be less likely to be usable to infer the context information.

At interaction 218, the context information (e.g., a portion of the context information, a textual summary of at least a portion of the context information) may be provided to guest device 102A by session manager 104. For example, the context information may be generated and provided to guest device 102A via (i) transmission via a message, (ii) storing in a storage with subsequent retrieval by guest device 102A, (iii) via a publish-subscribe system where guest device 102A subscribes to updates from session manager 104 thereby causing a copy of the context information to be propagated to guest device 102A, and/or via other processes.

By doing so, at least a portion of the context information collected during an anonymous session may be retained by guest device 102A and may not be retained by a system that provides the computer implemented services and/or that interacted with the new guest. The new guest may, therefore, utilize the session tracking token and the context information at future points in time to restore the anonymous session in the context of the previous anonymous session. Consequently, a quality of the computer implemented services utilized during the future anonymous sessions may be increased.

At interaction 220, a hash of the context information (e.g., a portion of the context information, a textual summary of at least a portion of the context information) may be provided to data processing system 100A by session manager 104. For example, the hash of the context information may be generated and provided to data processing system 100A via (i) transmission via a message, (ii) storing in a storage with subsequent retrieval by data processing system 100A, (iii) via a publish-subscribe system where data processing system 100A subscribes to updates from session manager 104 thereby causing a copy of the hash of the context information to be propagated to data processing system 100A, and/or via other processes.

The hash of the context information may be associated with the session tracking token and may be usable at future points in time to restore the anonymous session. While described in FIG. 2A as providing the hash of the context information to data processing system 100A for storage, the hash of the context information may be stored by any entity at any location without departing from embodiments disclosed herein.

By performing the processes and interactions shown in FIG. 2A, a guest may elect to continue an anonymous session at a future point in time using a session tracking token and context information without providing identifying information.

Turning to FIG. 2B, a second interaction diagram in accordance with an embodiment is shown. The second interaction diagram may illustrate processes and interactions that may occur during management of a session between a second new guest and the computer implemented services.

To manage the session between the second new guest and the computer implemented services, the second new guest (e.g., a user of guest device 102B) may request initiation of a session by providing a session request to session manager 104. The second new guest may be the new guest described in FIG. 2A or may be a different new guest. For example, guest device 102A may be a smart phone owned by the new guest and guest device 102B may be a laptop computer owned by the new guest. The session request may be similar to the session request described in FIG. 2A.

At interaction 222, the session request may be provided to session manager 104 by guest device 102B. For example, the session request may be generated and provided to session manager 104 via (i) transmission via a message, (ii) storing in a storage with subsequent retrieval by session manager 104, (iii) via a publish-subscribe system where session manager 104 subscribes to updates from guest device 102B thereby causing a copy of the session request to be propagated to session manager 104, and/or via other processes. By providing the session request to session manager 104, guest device 102B may provide information usable to facilitate initiation of a session between guest device 102B and computer implemented services (e.g., provided and/or facilitated by session manager 104 and/or data processing system 100A).

To initiate, at least in part, the requested session, anonymity intent resolution process 228 may be performed. During anonymity intent resolution process 228, information may be exchanged with guest device 102B to determine whether the second new guest wishes to remain anonymous during the requested session. Anonymity intent resolution process 228 may be similar to anonymity intent resolution process 206 described in FIG. 2A and may include interactions 224 and 226.

At interaction 224, a first query may be provided to guest device 102B by session manager 104. For example, the first query may be generated and provided to guest device 102B via (i) transmission via a message, (ii) storing in a storage with subsequent retrieval by guest device 102B, (iii) via a publish-subscribe system where guest device 102B subscribes to updates from session manager 104 thereby causing a copy of the first query to be propagated to guest device 102B, and/or via other processes. The first query may include a prompt displayed to the user of guest device 102B via a GUI, via a transmitted message, etc. The first query shown at interaction 224 may be similar to the first query shown at interaction 202 in FIG. 2A.

At interaction 226, a first response may be provided to session manager 104 by guest device 102B. For example, the first response may be generated and provided to session manager 104 via (i) transmission via a message, (ii) storing in a storage with subsequent retrieval by session manager 104, (iii) via a publish-subscribe system where session manager 104 subscribes to updates from guest device 102B thereby causing a copy of the first response to be propagated to session manager 104, and/or via other processes. The first response may include an indication of whether the second new guest wishes to remain anonymous, and the second new guest may generate the first response via interaction with a GUI, via a transmitted message, etc. The first response shown at interaction 226 may be similar to the first response shown at interaction 204 of FIG. 2A.

By providing the first response to session manager 104 and, therefore, indicating that the second new guest wishes to remain anonymous, session manager 104 may be prompted to perform session intent resolution process 234.

To determine a manner in which to initiate an anonymous session for the second new guest, session manager 104 may perform session intent resolution process 234. During session intent resolution process 234, information may be exchanged with guest device 102B to determine whether the second new guest wishes for the anonymous session to be able to be continued and/or if the second new guest wishes to continue a previous anonymous session. During anonymity intent resolution process, interactions 230 and 232 may occur.

At interaction 230, a second query may be provided to guest device 102B by session manager 104. For example, the second query may be generated and provided to guest device 102B via (i) transmission via a message, (ii) storing in a storage with subsequent retrieval by guest device 102B, (iii) via a publish-subscribe system where guest device 102B subscribes to updates from session manager 104 thereby causing a copy of the second query to be propagated to guest device 102B, and/or via other processes. The second query may include a prompt displayed to the user of guest device 102B via a GUI, via a transmitted message, etc.

The second query may prompt the second new guest to indicate whether they wish for the anonymous session to be able to be continued and/or whether they wish to continue a previous anonymous session.

At interaction 232, a second response may be provided to session manager 104 by guest device 102B. For example, the second response may be generated and provided to session manager 104 via (i) transmission via a message, (ii) storing in a storage with subsequent retrieval by session manager 104, (iii) via a publish-subscribe system where session manager 104 subscribes to updates from guest device 102B thereby causing a copy of the second response to be propagated to session manager 104, and/or via other processes. The second response may include an indication that the second new guest wishes to continue a previous anonymous session and the second new guest may generate the second response via interaction with a GUI, via a transmitted message, etc.

Following session intent resolution process 234, guest device 102B may provide an alleged copy of a session tracking token to session manager 104 along with context information collected during a previous anonymous session. The session tracking token may be usable to identify whether context information provided by one of the guests (e.g., the user of guest device 102B) was generated during a corresponding session with the one of the guests.

Session manager 104 may prompt guest device 102B to provide the session tracking token and the context information. In addition, guest device 102B may provide the session tracking token and context information without being prompted. The second new guest may enter the session tracking token (e.g., the numbers, letters and/or other characters associated with the session tracking token) and the context information into a GUI, etc.

At interaction 236, the session tracking token (e.g., the alleged copy of the session tracking token) may be provided to session manager 104 by guest device 102B. The session token may be considered an alleged copy of the session tracking token as the provided session tracking token has not yet been authenticated by session manager 104. For example, the session tracking token may be generated and provided to session manager 104 via (i) transmission via a message, (ii) storing in a storage with subsequent retrieval by session manager 104, (iii) via a publish-subscribe system where session manager 104 subscribes to updates from guest device 102B thereby causing a copy of the session tracking token to be propagated to session manager 104, and/or via other processes. The session tracking token may be similar to the session tracking token described in FIG. 2A.

At interaction 238, the context information may be provided to session manager 104 by guest device 102B. The context information may include context information recorded (e.g., by session manager 104 and/or data processing system 100A) during a previous anonymous session and provided to guest device 102B at the conclusion of the previous anonymous session. For example, the context information may be generated and provided to session manager 104 via (i) transmission via a message, (ii) storing in a storage with subsequent retrieval by session manager 104, (iii) via a publish-subscribe system where session manager 104 subscribes to updates from guest device 102B thereby causing a copy of the context information to be propagated to session manager 104, and/or via other processes. The context information may be the same context information collected during context information collection process 216 in FIG. 2A.

Following receipt of the alleged copy of the session tracking token and the context information, session manager 104 may perform session restoration process 240. During session restoration process 240, session manager 104 may: (i) retrieve a hash of context information associated with the provided session tracking token (e.g., shown at interaction 242), (ii) obtain a hash of the provided context information, (iii) compare the hash of the provided context information and the retrieved hash of context information, and/or (iv) if hash of the provided context information matches the hash of the retrieved context information, restoring the previous anonymous session. Session restoration process 240 may include interaction 242.

At interaction 242, a hash of context information may be provided to session manager 104 by data processing system 100A. The hash of context information may include a transformed version of context information recorded (e.g., by session manager 104 and/or data processing system 100A) during a previous anonymous session and associated with the alleged copy of the session tracking token provided at interaction 236. For example, the hash of context information may be generated and provided to session manager 104 via (i) transmission via a message, (ii) storing in a storage with subsequent retrieval by session manager 104, (iii) via a publish-subscribe system where session manager 104 subscribes to updates from data processing system 100A thereby causing a copy of the hash of context information to be propagated to session manager 104, and/or via other processes. The hash of context information may be the same hash of context information obtained by data processing system 100A at interaction 220 in FIG. 2A.

During session restoration process 240, past behavior of the second new guest may be utilized to provide the computer implemented services in context of the previous anonymous session. For example, past online shopping behavior may be utilized to provide tailored product recommendations to the second new guest. Consequently, a quality of the computer implemented services provided to the second new guest may be increased.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, processes and interactions shown in FIGS. 2A-2B may facilitate continuation of anonymous sessions for users in a manner that provides computer implemented services tailored to needs of the users.

Figure 3A:
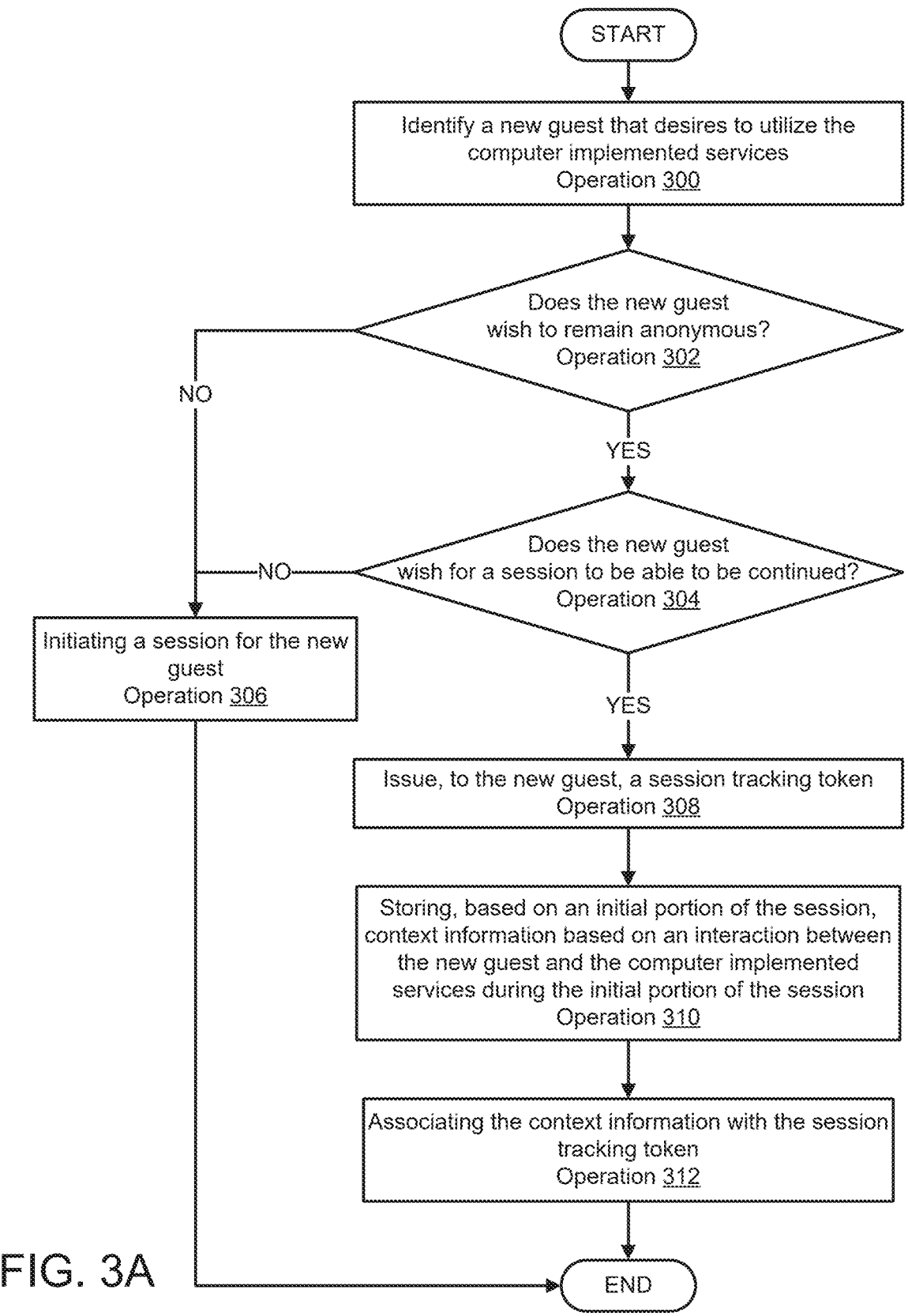
FIGS. 3A-3B show flow diagrams illustrating methods of managing sessions between guests and computer implemented services in accordance with an embodiment.
Figure 3B:
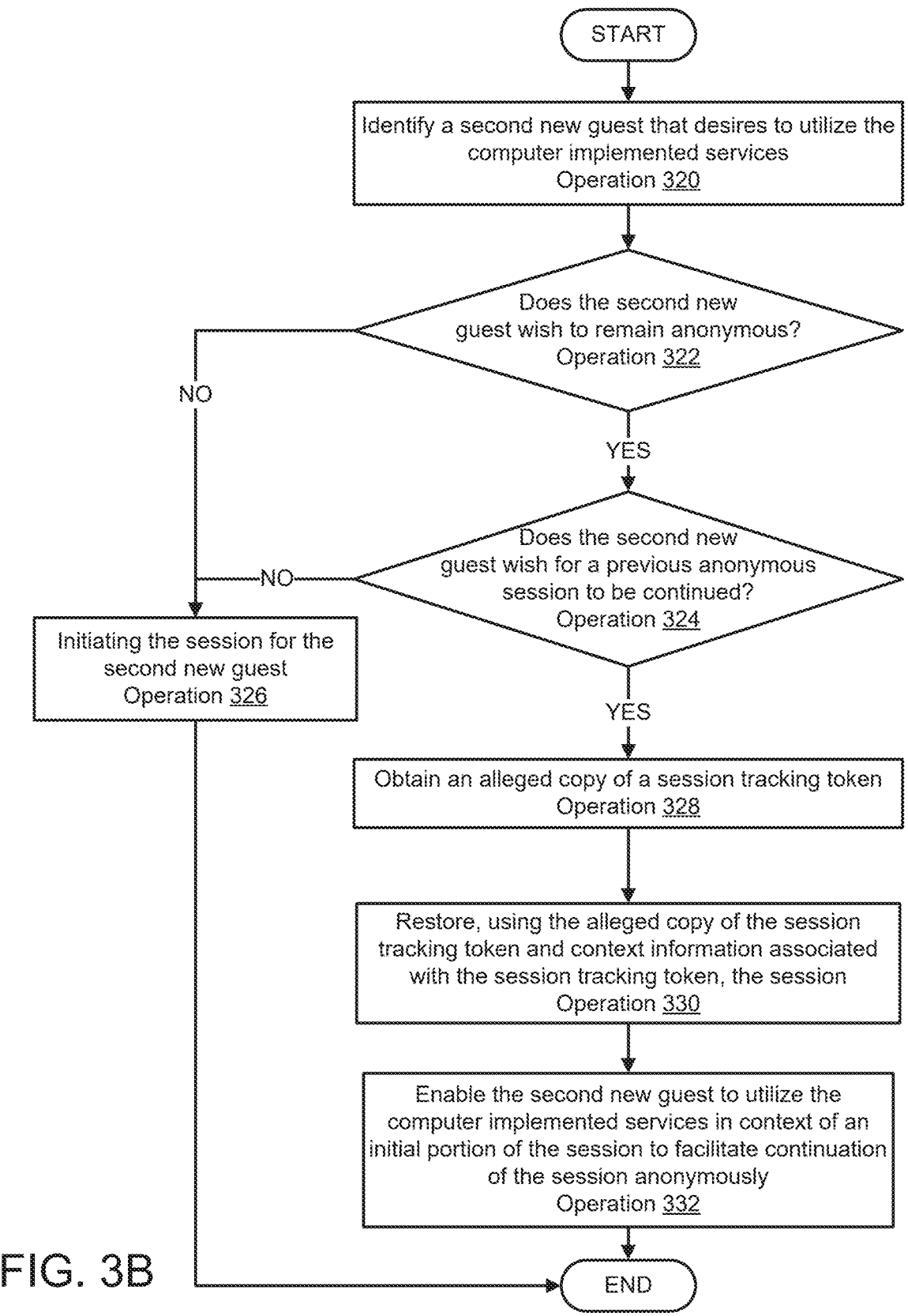

As discussed above, the components and/or data structures of FIG. 1 may perform various methods to manage sessions between guests and computer implemented services. FIGS. 3A-3B illustrate methods that may be performed by the components of FIG. 1. In the diagrams discussed below and shown in these figures, any of the operations may be repeated, performed in different orders, omitted, and/or performed in parallel and/or a partially overlapping in time manner with other operations.

Turning to FIG. 3A, a first flow diagram illustrating a method of managing a session for a new guest in accordance with an embodiment is shown. The method may be performed, for example, by a data processing system, a guest device, a session manager, and/or other entities.

At operation 300, a new guest that desires to utilize the computer implemented services may be identified. Identifying the new guest that desires to utilize the computer implemented services may include: (i) receiving a message indicating that the new guest wishes to utilize the computer implemented services, (ii) obtaining, via an application programming interface, a notification that the new guest has attempted to initiate a session (e.g., has visited a website, has opened an application), and/or (iii) other methods.

At operation 302, it may be determined whether the new guest wishes to remain anonymous. Determining whether the new guest wishes to remain anonymous may include performing an anonymity intent resolution process. Performing the anonymity intent resolution process may include: (i) querying the new guest (e.g., via a message, via a notification to a GUI accessible by the new guest) to ask whether the new guest wishes to remain anonymous during the session, (ii) receiving a response to the query from the new guest (e.g., via user input to the GUI, via transmission of a message), (iii) reading the response to determine whether the new guest wishes to remain anonymous, and/or (iv) other methods. The response may include a selection by the new guest. The new guest's selection may include "yes," "no," and/or other means of indicating whether the new guest wishes to remain anonymous.

If the response indicates that the new guest wishes to remain anonymous, the method may proceed to operation 304. If the response indicates that the new guest does not wish to remain anonymous, the method may proceed to operation 306.

At operation 306, a session may be initiated for the new guest. Initiating the session for the new guest that does not wish to remain anonymous may include prompting (e.g., via presenting a new GUI) the new guest to enter user credentials (e.g., a username, a password) and/or to create a new user profile using identifying information (e.g., a name, a phone number, an email address, a country of residence). Following obtaining the login credentials and/or the identifying information to generate a new profile, initiating the session may include: (i) providing access to the computer implemented services in context of a previous session (e.g., if the session is a continuation of a previous session by the new guest), (ii) collecting context information based on the identified new guest's actions during the session, (iii) storing the context information along with identifying information for the new guest, and/or (iv) other methods.

Returning to operation 302, the method may proceed to operation 304 if the new guest wishes to remain anonymous.

At operation 304, it may be determined whether the new guest wishes for the session to be able to be continued. Determining whether the new guest wishes for the session to be able to be continued may include performing a session intent resolution process. Performing the session intent resolution process may include: (i) querying the new guest (e.g., via a message, via a notification to a GUI accessible by the new guest) to ask whether the new guest wishes for the session to be able to be continued (e.g., at future points in time following conclusion of the session), (ii) receiving a response to the query from the new guest (e.g., via user input to the GUI, via transmission of a message), (iii) reading the response to determine whether the new guest wishes for the session to be able to be continued, and/or (iv) other methods. The response may include a selection by the new guest. The new guest's selection may include "yes," "no," and/or other means of indicating whether the new guest wishes for the session to be able to be continued.

If the response indicates that the new guest wishes for the session to be able to be continued, the method may proceed to operation 308. If the response indicates that the new guest does not wish for the session to be able to be continued, the method may proceed to operation 306.

At operation 306, a session may be initiated for the new guest. Initiating the session for the new guest that wishes to remain anonymous but does not wish for the session to be able to be continued may include providing access to the computer implemented services without collecting context information about the anonymous session. If the anonymous session is completed without collection of context information, the new guest may not be able to continue the anonymous session at a future point in time.

Returning to operation 304, the method may proceed to operation 308 if the new guest wishes for the session to be able to be continued.

At operation 308, a session tracking token may be issued to the new guest. Issuing the session tracking token to the new guest may include: (i) obtaining the session tracking token (e.g., generating the session tracking token, reading the session tracking token from storage, receiving the session tracking token from another entity), (ii) providing (e.g., via a message over a communication system, via storing in shared storage) the session tracking token to a data processing system operated by the new guest, and/or (iii) other methods.

Following operation 308, the session may be initiated for the new guest. Upon initiation of the session, context information may be collected for an initial portion of the session. At operation 310, context information based on an interaction between the new guest and the computer implemented services during the initial portion of the session may be stored based on the initial portion of the session. Storing the context information may include: (i) obtaining the context information (e.g., generating the context information based on the new guest's actions during the initial portion of the session, reading the context information from storage, receiving the context information from another entity), (ii) performing a storage process to save a copy of the context information in a storage architecture (e.g., temporary storage), (iii) providing the context information to another entity responsible for storing the context information, and/or (iv) other methods.

At operation 312, the context information may be associated with the session tracking token. Associating the context information with the session tracking token may include: (i) obtaining a copy of the session tracking token (and/or an identifier for the session tracking token), (ii) storing the copy of the session tracking token (and/or the identifier for the session tracking token) along with the context information, (iii) providing the identifier for the session tracking token to another entity responsible for storing the context information, (iv) labeling the context information in storage using the identifier for the session tracking token, and/or (v) other methods.

Following operation 312, the anonymous session may be concluded after a duration of time. After the anonymous session ends, the context information (e.g., at least a portion of the context information) may be provided to the new guest, the context information may be deleted by the system providing the computer implemented services, and a hash of the context information may be stored with the system.

Providing the context information to the new guest may include: (i) transmitting the context information via a message, (ii) storing the context information in shared storage, and/or (iii) other methods. Deleting the context information may include: (i) removing all stored copies of the context information, (ii) providing instructions to another entity to delete the context information, and/or (iii) other methods. Storing the hash of the context information may include: (i) generating the hash of the context information (e.g., using a hash function), (ii) performing a storage process to place the hash of the context information in storage along with the identifier for the session tracking token, (iii) providing the hash of the context information to another entity responsible for storing the hash of the context information, and/or (iv) other methods.

The method may end following operation 312.

By doing so, the new guest may be able to utilize the computer implemented services while remaining anonymous and may elect to continue the anonymous session at a future point in time using at least the session tracking token. Therefore, the computer implemented services may be more likely to be provided as desired by the new guest while complying with data privacy regulations.

Turning to FIG. 3B, a second flow diagram illustrating a method of managing a session for a second new guest in accordance with an embodiment is shown. The second new guest may be the new guest described in FIG. 3A or may be a different new guest. The method may be performed, for example, by a data processing system, a guest device, a session manager, and/or other entities.

At operation 320, a second new guest that desires to utilize the computer implemented services may be identified. Identifying the second new guest that desires to utilize the computer implemented services may include: (i) receiving a message indicating that the second new guest wishes to utilize the computer implemented services, (ii) obtaining, via an application programming interface, a notification that the second new guest has attempted to initiate a session (e.g., has visited a website, has opened an application), and/or (iii) other methods.

At operation 322, it may be determined whether the second new guest wishes to remain anonymous. Determining whether the second new guest wishes to remain anonymous may include methods similar to those described with respect to operation 302 in FIG. 3A.

If it is determined that the second new guest wishes to remain anonymous, the method may proceed to operation 324. If it is determined that the second new guest does not wish to remain anonymous, the method may proceed to operation 326.

At operation 326, a session may be initiated for the second new guest. Initiating the session for the second new guest that does not wish to remain anonymous may include prompting (e.g., via presenting a new GUI) the second new guest to enter user credentials (e.g., a username, a password) and/or to create a new user profile using identifying information (e.g., a name, a phone number, an email address, a country of residence). Following obtaining the login credentials and/or the identifying information to generate a new profile, initiating the session may include: (i) providing access to the computer implemented services in context of a previous session (e.g., if the session is a continuation of a previous session by the second new guest), (ii) collecting context information based on the identified second new guest's actions during the session, (iii) storing the context information along with identifying information for the second new guest, and/or (iv) other methods.

Returning to operation 322, the method may proceed to operation 324 if the second new guest wishes to remain anonymous.

At operation 324, it may be determined whether the second new guest wishes for a previous anonymous session to be continued. Determining whether the second new guest wishes for a previous anonymous session to be continued may include performing a session intent resolution process. Performing the session intent resolution process may include: ((i) querying the second new guest (e.g., via a message, via a notification to a GUI accessible by the second new guest) to ask whether the second new guest wishes to continue a previous anonymous session, (ii) receiving a response to the query from the second new guest (e.g., via user input to the GUI, via transmission of a message), (iii) reading the response to determine whether the second new guest wishes to continue a previous anonymous session, and/or (iv) other methods. The response may include a selection by the second new guest. The second new guest's selection may include "yes," "no," and/or other means of indicating whether the second new guest wishes for a previous anonymous session to be continued.

If it is determined that the second new guest wishes for a previous anonymous session to be continued, the method may proceed to operation 328. If it is determined that the second new guest does not wish for a previous anonymous session to be continued, the method may proceed to operation 326.

At operation 326, a session may be initiated for the second new guest. Initiating the session for the second new guest that wishes to remain anonymous but does not wish for a previous anonymous session to be continued may include providing access to the computer implemented services without collecting context information about the anonymous session. If the anonymous session is completed without collection of context information, the second new guest may not be able to continue the anonymous session at a future point in time.

Returning to operation 324, the method may proceed to operation 328 if the second new guest wishes for a previous anonymous session to be continued.

At operation 328, an alleged copy of a session tracking token may be obtained. Obtaining the alleged copy of the session tracking token may include: (i) reading the alleged copy of the session tracking token from storage, (ii) receiving, via a transmission over a communication system, the alleged copy of the session tracking token from another entity, (iii) receiving, as input to a GUI by a user, the alleged copy of the session tracking token, and/or (iv) other methods.

At operation 330, the session may be restored using the alleged copy of the session tracking token and context information associated with the session tracking token. Restoring the session may include: (i) obtaining the context information from a device utilized by the second new guest (e.g., via a message over a communication system, via reading it from shared storage), (ii) attempting to validate the context information using a hash of context information based on a previous anonymous session associated with the session tracking token, (iii) concluding, if the context information is valid, that the context information is usable to restore the session.

Attempting to validate the context information may include: (i) obtaining (e.g., generating using a hash function) a hash of the context information provided by the device utilized by the second new guest, (ii) obtaining the hash of context information associated with the session tracking token from storage (e.g., a previously stored hash of context information obtained during a previous anonymous session associated with the session tracking token), (iii) comparing the generated hash of the context information to the previously stored hash of the context information, and/or (iv) if the generated hash of the context information matches the previously stored hash of the context information, concluding that the alleged copy of the session tracking token is authentic.

Concluding that the context information is usable to restore the session may include: (i) approving continuation of the previous anonymous session, (ii) providing a notification to the device utilized by the second new guest that the context information was successfully validated, and/or (iii) other methods.

At operation 332, the second new guest may be enabled to utilize the computer implemented services in context of an initial portion of the session to facilitate continuation of the session anonymously. The initial portion of the session may refer to a duration of time included in the previous anonymous session that has been restored. Enabling the second new guest to utilize the computer implemented services in the context of the initial portion of the session may include restoring any configurations, settings, and/or other modifiable elements of the computer implemented services based on the context information. For example, items previously placed in a digital shopping cart by the second new guest during the previous anonymous session may be placed in a digital shopping cart for use in the current (e.g., continued) anonymous session.

The method may end following operation 332.

If the second new guest has an existing profile, account, and/or has otherwise previously provided permission to utilize the computer implemented services while being identified, the second new guest may (at any point during the continued anonymous session) choose to link the continued anonymous session to their previous non-anonymous session.

Doing so may include: (i) identifying that the second new guest wishes to link the session (e.g., the continued anonymous session that was restored) to an existing known guest that does not wish to remain anonymous (e.g., an account, a profile), (ii) obtaining, from the second new guest, credentials for the existing known guest, (iii) adding, if the credentials are usable to authenticate the second new guest, the context information to other context maintained for the known guest to facilitate merging of the session with another session for the known guest, and/or (iv) other methods.

Identifying that the new guest wishes to link the session to an existing known guest that does not wish to remain anonymous may include: (i) receiving a message indicating that the second new guest wishes to link the session to an existing known guest, (ii) obtaining, via an application programming interface, a notification that the second new guest has attempted to provide the credentials, and/or (iii) other methods.

Obtaining the credentials may include: (i) prompting (e.g., via a GUI) the second new guest to enter a username, password, pin, biometric factor, and/or other information (ii) receiving the credentials via a message over a communication system, and/or (iii) other methods.

Adding the context information to the other context may include: (i) supplementing, using the context information provided by the second new guest, a previously generated data structure including context information collected during previous non-anonymous sessions, (ii) initiating collection of new non-anonymous context info associated with the known guest (instead of associated with the session tracking token, and/or (iii) other methods.

Thus, using the method shown in FIGS. 3A-3B, embodiments disclosed herein may manage sessions between guests and computer implemented services so that computer implemented services have a higher likelihood of being provided as desired for guests that wish to remain anonymous.

Figure 4:
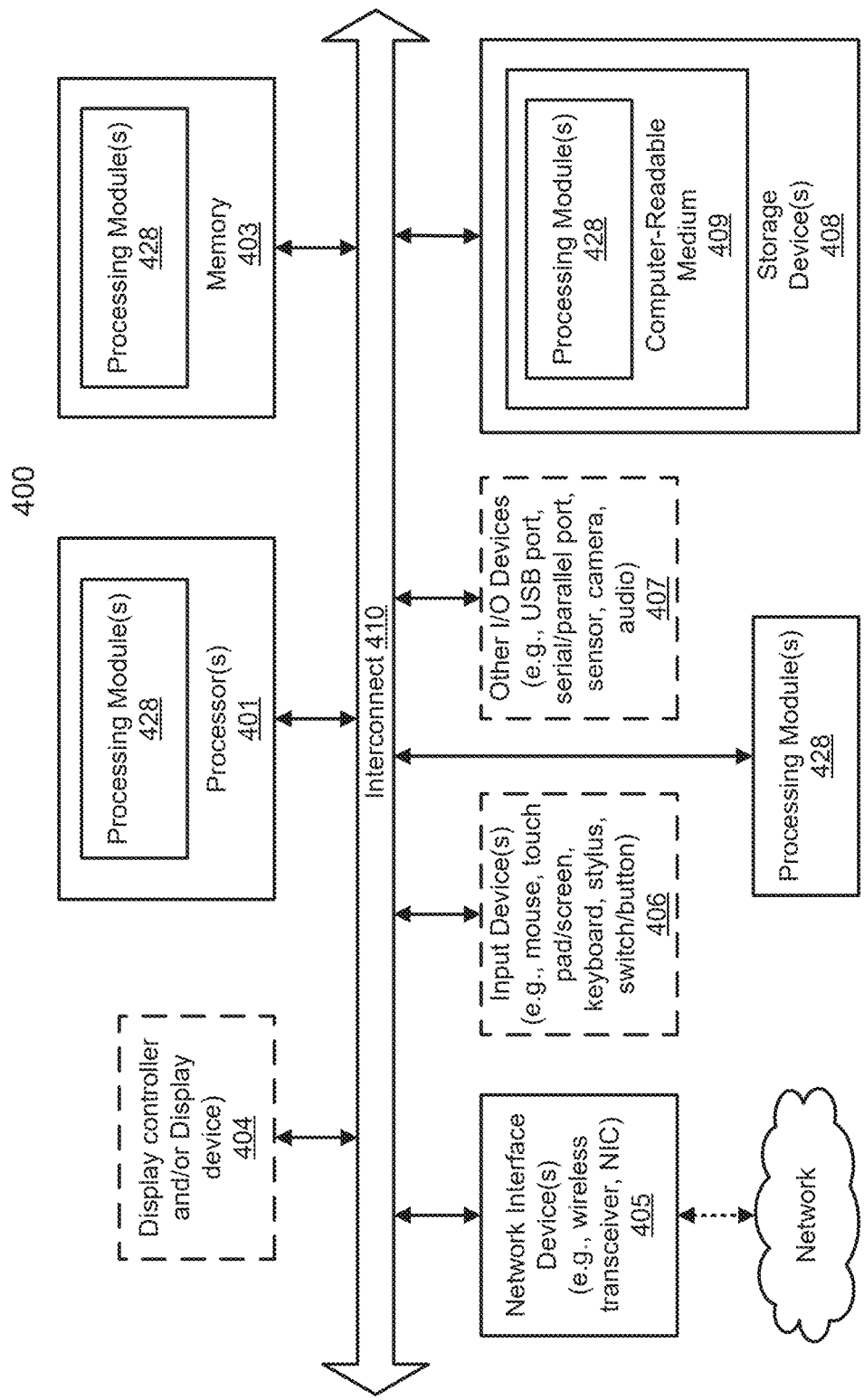
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing sessions between guests and computer implemented services, the method comprising:
   identifying a new guest that desires to utilize the computer implemented services;
   based on the identifying of the new guest:
      performing an anonymity intent resolution process for the new guest to identify whether the new guest wishes to remain anonymous;
      in an instance of the performing of the anonymity intent resolution process where the new guest wishes to remain anonymous:
         performing a session intent resolution process for the new guest;
         in an instance of the session intent resolution process where the new guest wishes for a session to be able to be continued:
            issuing, to the new guest, a session tracking token;
            storing, based on an initial portion of the session, context information based on an interaction between the new guest and the computer implemented services during the initial portion of the session; and
            associating the context information with the session tracking token.

2. The method of claim 1, further comprising:
   after the initial portion of the session ends:
      identifying a second new guest that desires to utilize the computer implemented services;
      based on the identifying of the second new guest:
         performing a second anonymity intent resolution process for the second new guest to identify whether the second new guest wishes to remain anonymous;
         in an instance of the performing of the second anonymity intent resolution process where the new guest wishes to remain anonymous:
            performing a second session intent resolution process for the second new guest;
            in an instance of the second session intent resolution process for the second new guest where the second new guest wishes for a previous anonymous session to be continued:
               obtaining, from the second new guest, an alleged copy of the session tracking token;
               restoring, using the alleged copy of the session tracking token and the context information associated with the session tracking token, the session; and
               enabling the second new guest to utilize the computer implemented services in context of the initial portion of the session to facilitate continuation of the session anonymously.

3. The method of claim 2, wherein the context information is stored with a device utilized by the new guest and not retained by a system that provides the computer implemented services and/or that interacted with the new guest.

4. The method of claim 3, further comprising:
   storing a hash of the context information with the system.

5. The method of claim 4, wherein restoring the session comprises:
   obtaining the context information from a device utilized by the second new guest;
   attempting to validate the context information using the hash; and
   in an instance of the attempting where the context information is validated:
      concluding that the context information is usable to restore the session.

6. The method of claim 2, further comprising:
   identifying that the second new guest wishes to link the session to an existing known guest that does not wish to remain anonymous;
   obtaining, from the second new guest, credentials for the existing known guest; and
   in an instance of the obtaining where the credentials are usable to authenticate the second new guest:
      adding the context information to other context maintained for the known guest to facilitate merging of the session with another session for the known guest.

7. The method of claim 1, wherein the computer implemented services are provided by a first system, the new guest utilizes a second system to utilize the computer implemented services provided by the first system, and the first system is configured to only retain context information regarding use of the computer implemented services by guests that do not express an intent to remain anonymous during active sessions for the guests.

8. The method of claim 1, wherein the session tracking token is not associated with any guest that utilizes the computer implemented services.

9. The method of claim 8, wherein the session tracking token is usable to identify whether context information provided by one of the guests was generated during a corresponding session with the one of the guests.

10. A non-transitory machine-readable medium having instructions stored therein, which when executed by a processor, cause the processor to perform operations for managing sessions between guests and computer implemented services, the operations comprising:
  identifying a new guest that desires to utilize the computer implemented services;
  based on the identifying of the new guest:
    performing an anonymity intent resolution process for the new guest to identify whether the new guest wishes to remain anonymous;
    in an instance of the performing of the anonymity intent resolution process where the new guest wishes to remain anonymous:
      performing a session intent resolution process for the new guest;
      in an instance of the session intent resolution process where the new guest wishes for a session to be able to be continued:
        issuing, to the new guest, a session tracking token;
        storing, based on an initial portion of the session, context information based on an interaction between the new guest and the computer implemented services during the initial portion of the session; and
        associating the context information with the session tracking token.

11. The non-transitory machine-readable medium of claim 10, further comprising:
  after the initial portion of the session ends:
    identifying a second new guest that desires to utilize the computer implemented services;
    based on the identifying of the second new guest:
      performing a second anonymity intent resolution process for the second new guest to identify whether the second new guest wishes to remain anonymous;
      in an instance of the performing of the second anonymity intent resolution process where the new guest wishes to remain anonymous:
        performing a second session intent resolution process for the second new guest;
        in an instance of the second session intent resolution process for the second new guest where the second new guest wishes for a previous anonymous session to be continued:
          obtaining, from the second new guest, an alleged copy of the session tracking token;
          restoring, using the alleged copy of the session tracking token and the context information associated with the session tracking token, the session; and
          enabling the second new guest to utilize the computer implemented services in context of the initial portion of the session to facilitate continuation of the session anonymously.

12. The non-transitory machine-readable medium of claim 11, wherein the context information is stored with a device utilized by the new guest and not retained by a system that provides the computer implemented services and/or that interacted with the new guest.

13. The non-transitory machine-readable medium of claim 12, further comprising:
  storing a hash of the context information with the system.

14. The non-transitory machine-readable medium of claim 13, wherein restoring the session comprises:
  obtaining the context information from a device utilized by the second new guest;
  attempting to validate the context information using the hash; and
  in an instance of the attempting where the context information is validated:
    concluding that the context information is usable to restore the session.

15. The non-transitory machine-readable medium of claim 11, further comprising:
  identifying that the second new guest wishes to link the session to an existing known guest that does not wish to remain anonymous;
  obtaining, from the second new guest, credentials for the existing known guest; and
  in an instance of the obtaining where the credentials are usable to authenticate the second new guest:
    adding the context information to other context maintained for the known guest to facilitate merging of the session with another session for the known guest.

16. A data processing system, comprising:
  a processor; and
  a memory coupled to the processor to store instructions, which when executed by the processor, cause the processor to perform operations for managing sessions between guests and computer implemented services, the operations comprising:
    identifying a new guest that desires to utilize the computer implemented services;
    based on the identifying of the new guest:
      performing an anonymity intent resolution process for the new guest to identify whether the new guest wishes to remain anonymous;
      in an instance of the performing of the anonymity intent resolution process where the new guest wishes to remain anonymous:
        performing a session intent resolution process for the new guest;
        in an instance of the session intent resolution process where the new guest wishes for a session to be able to be continued:
          issuing, to the new guest, a session tracking token;
          storing, based on an initial portion of the session, context information based on an interaction between the new guest and the computer implemented services during the initial portion of the session; and
          associating the context information with the session tracking token.

17. The data processing system of claim 16, further comprising:
  after the initial portion of the session ends:
    identifying a second new guest that desires to utilize the computer implemented services;
    based on the identifying of the second new guest:
      performing a second anonymity intent resolution process for the second new guest to identify whether the second new guest wishes to remain anonymous;
      in an instance of the performing of the second anonymity intent resolution process where the new guest wishes to remain anonymous:
        performing a second session intent resolution process for the second new guest;
        in an instance of the second session intent resolution process for the second new guest where the second new guest wishes for a previous anonymous session to be continued:

obtaining, from the second new guest, an alleged copy of the session tracking token;

restoring, using the alleged copy of the session tracking token and the context information associated with the session tracking token, the session; and enabling the second new guest to utilize the computer implemented services in context of the initial portion of the session to facilitate continuation of the session anonymously.

18. The data processing system of claim 17, wherein the context information is stored with a device utilized by the new guest and not retained by a system that provides the computer implemented services and/or that interacted with the new guest.

19. The data processing system of claim 18, wherein the operations further comprise:

storing a hash of the context information with the system.

20. The data processing system of claim 19, wherein restoring the session comprises:

obtaining the context information from a device utilized by the second new guest;

attempting to validate the context information using the hash; and in an instance of the attempting where the context information is validated:

concluding that the context information is usable to restore the session.

\* \* \* \* \*